United States Patent
Magee

(10) Patent No.: US 7,406,494 B2
(45) Date of Patent: Jul. 29, 2008

(54) METHOD OF GENERATING A CYCLE-EFFICIENT BIT-REVERSE INDEX ARRAY FOR A WIRELESS COMMUNICATION SYSTEM

(75) Inventor: David P. Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 865 days.

(21) Appl. No.: 10/438,241

(22) Filed: May 14, 2003

(65) Prior Publication Data

US 2003/0217084 A1    Nov. 20, 2003

Related U.S. Application Data

(60) Provisional application No. 60/380,616, filed on May 14, 2002.

(51) Int. Cl.
*G06F 17/14* (2006.01)

(52) U.S. Cl. .................................................. 708/404
(58) Field of Classification Search ................ 708/404
See application file for complete search history.

(56) References Cited

U.S. PATENT DOCUMENTS

| 5,012,441 | A  | * | 4/1991 | Retter | ....................... 711/217 |
| 6,279,096 | B1 | * | 8/2001 | McCoy et al. | ................ 711/211 |
| 6,351,758 | B1 |   | 2/2002 | Courtney et al. | |
| 6,549,998 | B1 | * | 4/2003 | Pekarich et al. | ............. 711/220 |
| 6,609,140 | B1 | * | 8/2003 | Greene | ....................... 708/404 |
| 6,629,117 | B2 | * | 9/2003 | Aizenberg et al. | .......... 708/404 |
| 7,047,268 | B2 | * | 5/2006 | Harley et al. | ................ 708/404 |

* cited by examiner

*Primary Examiner*—David H Malzahn
(74) *Attorney, Agent, or Firm*—Steven A. Shaw; W. James Brady; Frederick J. Telecky, Jr.

(57) ABSTRACT

An efficient method of generating a bit-reverse index array in real time without performing any bit manipulation for a wireless communication system.

14 Claims, 2 Drawing Sheets

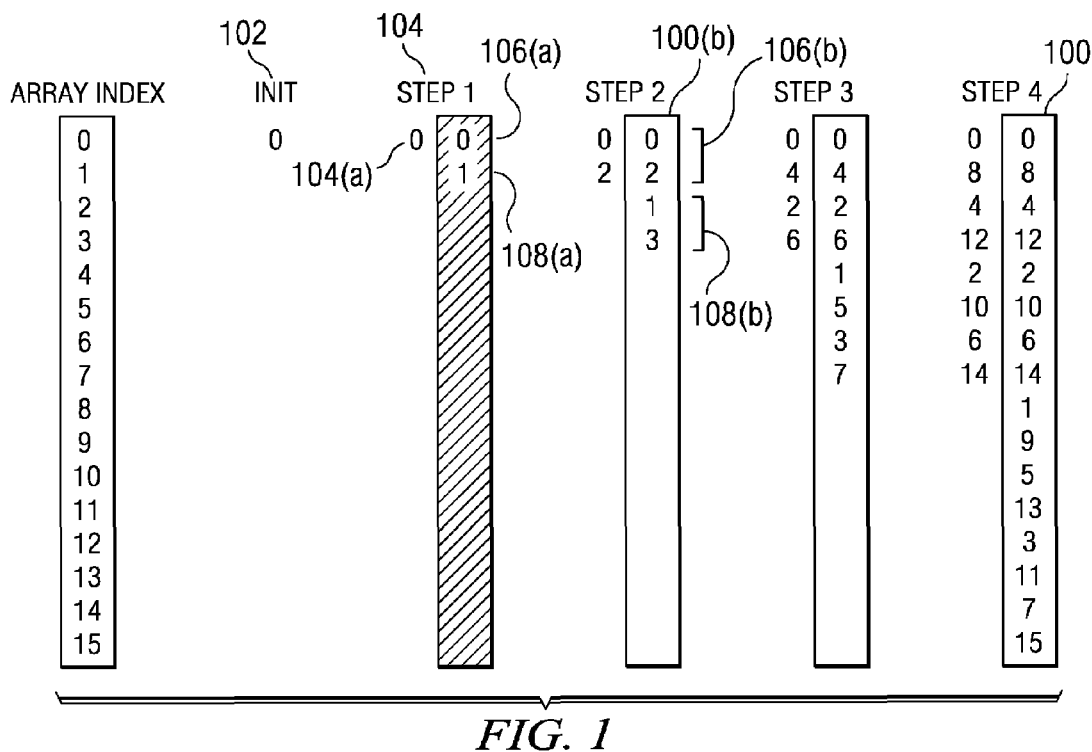

FIG. 1

```
// generates a N-pnt bit reversed index array
void GenNpntBRIndexArray(const uint N,uint BRIndexArray[])
{
  uint k,l,reg1;
  uint *pBRIndexArray1, *pBRIndexArray2;

// initialize the first element
  BRIndexArray[0]=0;

for(k=1;k<N;k*=2)
    {
      // assign pointers
      pBRIndexArray1 = &BRIndexArray[0];
      pBRIndexArray2 = &BRIndexArray[k];

for(l=0;l<k;l++)
        {
        reg1= *pBRIndexArray1 << 1;
        *pBRIndexArray1++ = reg1;
        *pBRIndexArray2++ = reg1+1;
        }
    } return;
} // end of GenNpntBRIndexArray()
```

METHOD OF GENERATING A CYCLE-EFFICIENT BIT-REVERSE INDEX ARRAY FOR A WIRELESS COMMUNICATION SYSTEM

CROSS REFERENCES TO RELATED APPLICATIONS

This application claims the benefit, under 35 U.S.C. §119 (e)(1) of U.S. Provisional Application No. 60/380,616, filed May 14, 2002, and incorporated herein by this reference.

STATEMENT REGARDING FEDERALLY SPONSORED RESEARCH OR DEVELOPMENT

N/A

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to wireless communication systems, and more particularly, to a method of generating a cycle efficient, bit-reverse index array for a wireless communication systems.

2. Description of the Prior Art

Signal processing algorithms associated with most wireless communication systems manipulate data in the time and frequency domains. Some of these algorithms require the data to be in normal order while other algorithms need the data in bit-reversed order. It is not however, desirable to swap the order of the data in real time to meet the needs of each algorithm. Although many methods exist for generating bit-reverse index arrays, all of these known methods most often seem to be concerned with bit-manipulation of a particular index value. These methods, for example, involve more efficient ways of taking the binary representation of the index value and bit-reversing it. However, these binary manipulations can be very time consuming and are not well suited for real-time operation.

In view of the above, there is a need in the wireless communication art for an efficient method of generating a bit-reverse index array in real time without performing any bit manipulation.

SUMMARY OF THE INVENTION

The present invention is directed to an efficient method of generating a bit-reverse index array in real time without performing any bit manipulation for a wireless communication system. The method begins by initializing the first value of the index array to 0. In step 1 (first step following initialization), the values from the previous step are multiplied by 2 to obtain the first portion of the index array. The second portion of the index array is found by adding 1 to the first portion of the index array for this step. Similarly, in step 2, the values from the previous step are multiplied by 2 to obtain the first portion of the index array. The second portion of the index array is found by adding 1 to the first portion of the index array for this step. This process is repeated until the index array grows to the desired length of the bit-reverse index array. In general, log2(N) steps will be required, where N is the length of the desired bit-reverse index array. Because the multiply is by 2, multipliers and adders can be eliminated since a left shift will accomplish the multiply by 2 and an incrementer will accomplish the add by 1. The method is therefore hardware efficient.

In one aspect of the invention, a method of generating a bit-reverse index array for a wireless communication system is implemented without performing any bit manipulation.

In another aspect of the invention, a method of generating an efficient bit-reverse index array for a wireless communication system is implemented in real time.

In yet another aspect of the invention, a method of generating a bit-reverse index array for a wireless communication system is implemented in real time without performing any bit manipulation and without evaluating any binary representations of the index value.

In still another aspect of the invention, a method of generating a bit-reverse index array for a wireless communication system is implemented with a higher degree of efficiency than that achievable using known methods.

In yet another aspect of the instant invention, the bit-reverse index algorithm is implemented in a digital signal processor device where the index array is comprised of portions of a memory location associated with the digital signal processor.

BRIEF DESCRIPTION OF THE DRAWINGS

Other aspects, features and attendant advantages of the present invention will be readily appreciated as the invention becomes better understood by reference to the following detailed description when considered in connection with the accompanying drawings wherein:

FIG. 1 is a diagram illustrating how a bit-reverse index array is generated according to one embodiment of the present invention;

FIG. 2 is a C code listing for generating the bit-reverse index array depicted in the diagram shown in FIG. 1.

Figure 3:
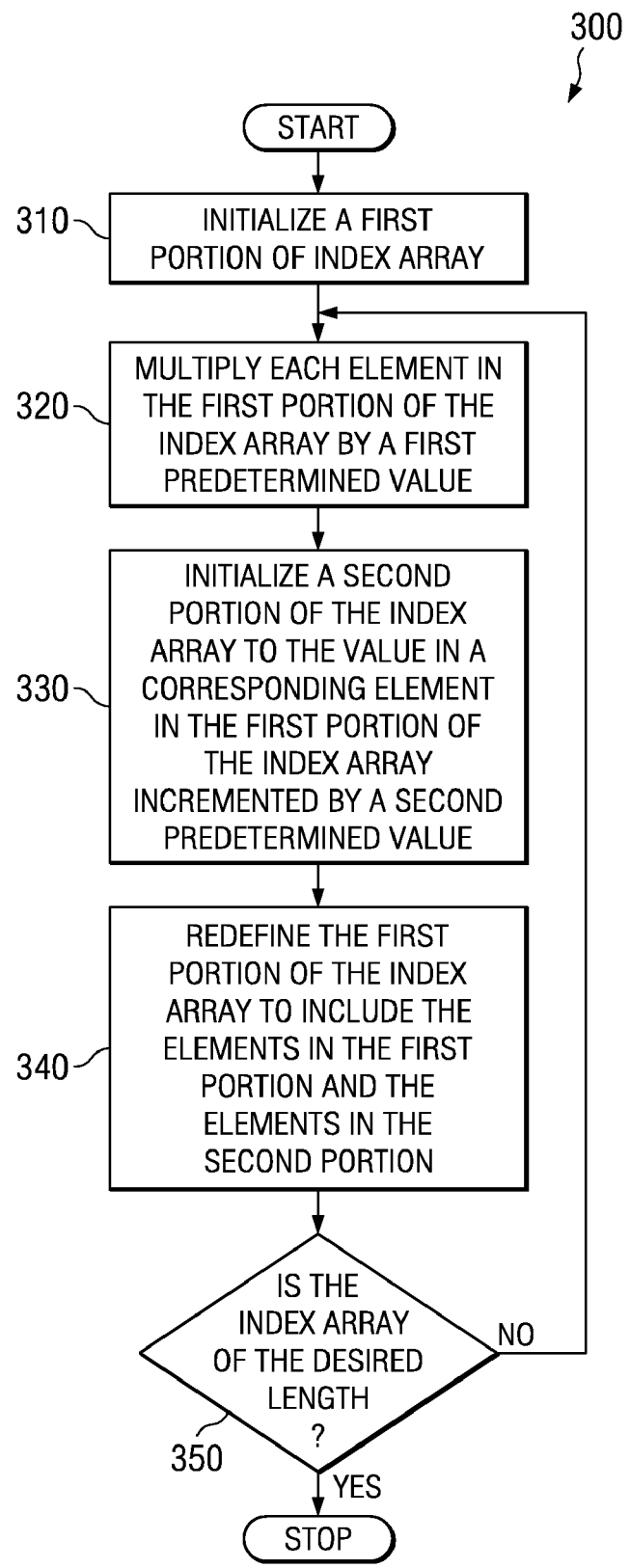
FIG. 3 is a flow diagram showing the operation of the bit reverse index algorithm in accordance with the present invention.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments discussed herein below are best understood by first reiterating relevant portions of the background set forth herein before to establish a context for the present invention. Signal processing algorithms associated with most wireless communication systems manipulate data in the time and frequency domains. Some of these algorithms require the data to be in normal order while other algorithms need the data in bit-reversed order. It is not however, desirable to swap the order of the data in real time to meet the needs of each algorithm. Although many methods exist for generating bit-reverse index arrays, all of these known methods most often seem to be concerned with bit-manipulation of a particular index value. These methods, for example, involve more efficient ways of taking the binary representation of the index value and bit-reversing it. In view of the foregoing, a preferred embodiment of the present invention is now set forth below that describes an efficient method of generating a bit-reverse index array in real time without performing any bit manipulation for a wireless communication system.

FIG. 1 is a diagram illustrating how a bit-reverse index array 100 for 16 values is generated according to one embodiment of the present invention. The method begins by first initializing the first value of the index array to 0 as shown by the "Init Step" 102. In "Step 1" (enumerated 104), the values from the previous step 102 are multiplied by 2 to obtain the first portion 106(a) of the bit-reverse index array 100. This operation is shown as the first column under the heading of "Step 1". The second portion 108(a) of the bit-reverse index array 100 is found by adding 1 to the first portion 106 of the bit-reverse index array 100 for this step. The shaded portion under the heading of "Step 1" depicts the values in the index array after these two operations. Similarly, in "Step 2", the values from the previous step are multiplied by 2 to obtain the first portion 106(b) of the bit-reverse index array 100 for this step. The second portion 108(b) of the bit-reverse index array 100 is found by adding 1 to the first portion 106(b) of the bit-reverse index array 100 for this step. The foregoing process is repeated until the index array grows to the desired length of the bit-reverse index array 100. In general, log2(N) steps will be required, where 'N' is the length of the desired bit-reverse index array. Generally, 'N' is a power of 2. Thus, for N=16, there are log2(16)=4 steps required to generate the entire bit-reverse index array 100.

The total number of adds and the total number of multiplies to implement the foregoing method can be determined from the following expression written as $$\left.\begin{array}{c}\text{\# of mults}\\ \text{\# of adds}\end{array}\right\} = \sum_{n=1}^{\log 2(N)} 2^{n-1} = N - 1 \quad (1)$$

Importantly, multipliers and adders are not necessary to implement the foregoing method since the multiply is by 2 that can be implemented with a left shift, and since the add 1 to each existing index can be implemented with an incrementer. The foregoing method is therefore more hardware efficient than known methods of manipulating data to generate bit-reverse index arrays. The efficiency of the foregoing method is further demonstrated in FIG. 2 that depicts a C code listing for generating the bit-reverse index array 100 shown in FIG. 1.

In another embodiment of the present invention, the index array comprises a set of memory locations processed by a central processing unit in a computing or data processing device such as a personal computer (PC) or a digital signal processor (DSP) device such as the TMS320C6000 family of digital signal processor devices manufactured by Texas Instruments Incorporated, the assignee of the instant invention. The operation of a DSP implementing the instant invention is shown in the flow chart in FIG. 3. In the case of such a DSP, a first memory location is defined to be the first element in the index array and is initialized to zero as shown at block 310. This first element is the first portion of the index array. The value in each element in the first portion of the index array is then multiplied by a first predetermined value as shown at block 320. Continuing with the example set forth hereinabove, the first predetermined value is two.

Then, a second set of memory locations in the DSP equal in length to the first set of memory locations is defined to be the second portion of the index array. As shown at block 330, each element in the second portion of the index array is then initialized to the value in a corresponding element of the first portion of the index array incremented by a second predetermined value. Continuing again with the example set forth hereinabove, the second predetermined value is one. The first portion of the index array is then re-defined to include the elements in the first portion and the elements in the second portion of the index array as indicated at block 340. If the resultant index array is not of the desired length, then steps 320 through 340 are repeated until the length of the first portion of the index array has reached the desired length as indicated at decision block 350. Continuing again with the example set forth hereinabove, if the first predetermined value is two and the number of bits in each element of the memory location is three, then the desired length is $2^3$, which is 8.

Although described as memory locations internal to the DSP, one skilled in the art would recognize that the memory locations for implementing the index array may also be external to the DSP. Another advantage of using a DSP to implement the instant invention is that the multiple instructions can be executed in a single clock cycle, thereby providing for increased efficiency in the operation of the algorithm of the instant invention. Thus, for example, the step of initializing the first portion of the index array with the value that has been multiplied by the first predetermined value and the step of computing the second portion of the index array with the value in a corresponding element of the first portion of the index array increased by a second predetermined value can both be executed in a single clock cycle of the DSP.

In summary explanation of the preferred embodiment, an efficient method of generating a bit-reverse index array in real time is implemented without performing any bit manipulation for a wireless communication system. The method is straight forward, requiring only log2(N) steps, where N is the length of the desired bit-reverse index array.

In view of the above, it can be seen the present invention presents a significant advancement in the art of generating bit-reverse index arrays for wireless communication systems. Further, this invention has been described in considerable detail in order to provide those skilled in the wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A programmable processing device for generating a bit-reverse index array of memory locations in a memory processed by a central processing unit for a wireless communication system, the programmable processing device executing instructions embodied in a portion of said memory instructing the programmable processing device to perform the steps of:

(a) initializing a first memory location of an index array of memory locations, in the memory, to 0;

using the central processing unit:
(b) multiplying the initialized first memory location by the number 2 to generate a first portion of the index array of memory locations;
(c) adding the number 1 to the first portion of the index array to generate a second portion of the index array of memory locations, wherein the first portion and the second portion comprise a new set of numbers;
(d) multiplying each number in the new set of numbers by the number 2 to generate a new first portion of the index array of memory locations, wherein the new first portion of the index array comprises a new set of numbers;
(e) adding the number 1 to each number in the new first portion of the index array to generate a new second portion of the index array, wherein the new first portion and the new second portion comprises a new set of numbers; and
(f) repeating steps (d) and (e) until the index array of memory locations grows to a bit-reverse index array of memory locations having a desired length.

2. The programmable processing device according to claim 1 further comprising instructions embodied in a portion of said memory instructing the programmable processing device to perform a combined total of log2(N) repeating steps, where N is the length of the desired bit-reverse index array.

3. The programmable processing device according to claim 1 wherein each multiplication instruction for each step further comprises instructions embodied in a portion of said memory instructing the programmable processing device to solely perform a left shift operation.

4. The programmable processing device according to claim 1 wherein each addition instruction for each step further comprises instructions embodied in a portion of said memory instructing the programmable processing device to solely perform an increment operation.

5. The programmable processing device according to claim 1 wherein the initializing, multiplication and addition steps are achieved without bit manipulation of any individual index value.

6. The programmable processing device according to claim 1 wherein the initializing, multiplication and addition steps are achieved without evaluating any binary representations of index values.

7. A programmable processing device coupled to a memory for generating a bit-reverse index array of memory locations, the programmable processing device executing instructions embodied in a portion of said memory instructing the programmable processing device to perform the steps of:
(a) initializing a first value of an index array stored in the memory to 0 to generate a first set of the index array of memory locations;
using a central processing unit:
(b) adding the number 1 to the first set of memory locations to generate a second set of memory locations, wherein the first set and the second set comprise a new set of numbers;
(c) multiplying each number in the new set of numbers by the number 2 to generate a new first set of memory locations, wherein the new first set of the index array comprises a new set of numbers;
(d) adding the number 1 to each number in the new first set of the index array to generate a new second set of memory locations, wherein the new first set and the new second set comprises a new set of numbers; and
(e) repeating steps (c) and (d) until the index array of memory locations grows to a bit-reverse index array of memory locations having a desired length.

8. A programmable processing device coupled to a memory for generating a bit-reversed index array of memory locations of n-bit binary values, the programmable processing device executing instructions embodied in a portion of said memory instructing the programmable processing device to perform the steps of:
(a) initializing a first set of memory locations stored in the memory; using a central processing unit:
(b) computing each value in the first set of memory locations by multiplying each said value by a first predetermined amount;
(c) updating each value in the first set of memory locations;
(d) computing each value in a second set of memory locations by adding a second predetermined amount to a corresponding one of the first set of memory locations;
(e) updating each value in the second set of memory locations;
(f) re-defining the first set of memory locations to include the second set of memory locations; and
(g) repeating steps (b) through (f) until the re-defined first set of memory locations is of a desired length, wherein the index to each memory location in a set of memory locations being the bit reverse of the value stored in that element of the set of memory locations.

9. The programmable processing device of claim 8 wherein the desired length of the index array is $2^n$.

10. The programmable processing device of claim 8 wherein the first portion of the index array is initialized to zero.

11. The programmable processing device of claim 8 wherein the first predetermined value is 2 and the second predetermined amount is 1.

12. The programmable processing device of claim 11 wherein the step of computing each value in the second portion of the index array by adding the second predetermined amount to a corresponding value in the first portion of the index array includes the step of computing each value in the second portion of the index array by incrementing a corresponding value in the first portion of the index array.

13. The programmable processing device of claim 12 wherein the step of updating the first portion of the index array and the step of computing the second portion of the index array are performed in a single clock cycle of the digital signal processing device.

14. The programmable processing device claim 8 wherein the first portion of the index array and the second portion of the index array are the same length.

* * * * *